Figures 1, 2:
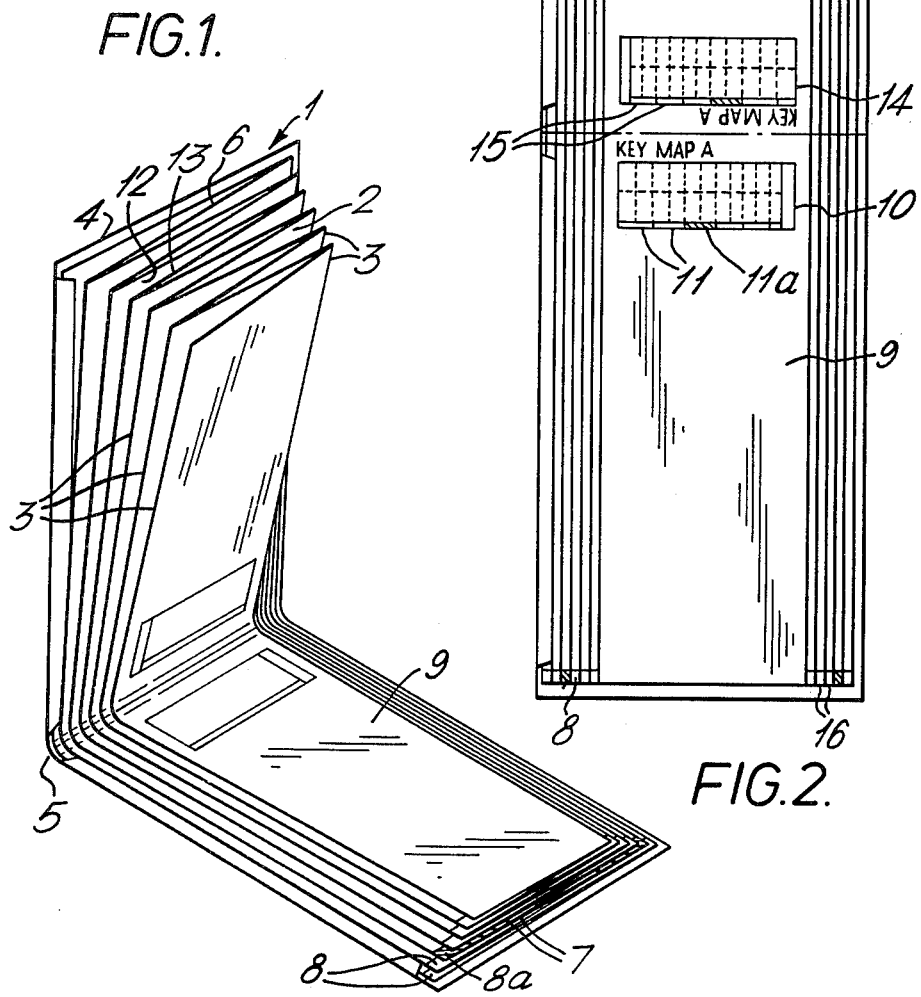

United States Patent [19]

Robbins et al.

[11] 4,210,347
[45] Jul. 1, 1980

[54] MAPS

[75] Inventors: Ralph G. Robbins; Victor E. Bates, both of Basingstoke, England

[73] Assignee: The Automobile Association Limited, Basingstoke, England

[21] Appl. No.: 923,735

[22] Filed: Jul. 11, 1978

[30] Foreign Application Priority Data

Jul. 15, 1977 [GB] United Kingdom .............. 29848/77

[51] Int. Cl.² ............................................. G09B 29/00
[52] U.S. Cl. ...................................................... 283/35
[58] Field of Search .................................... 283/34, 35

[56] References Cited

U.S. PATENT DOCUMENTS

| 1,687,304 | 10/1928 | Morris | 283/34 |
|---|---|---|---|
| 2,118,964 | 5/1938 | Bonnaire | 283/34 |
| 2,179,172 | 11/1939 | Bonnaire | 283/35 |
| 2,471,552 | 5/1949 | Specter et al. | 283/35 |

FOREIGN PATENT DOCUMENTS

| 425788 | 3/1935 | United Kingdom | 283/35 |
|---|---|---|---|
| 765376 | 1/1957 | United Kingdom | 283/34 |

*Primary Examiner*—Gerald A. Dost
*Attorney, Agent, or Firm*—Bacon & Thomas

[57] ABSTRACT

A map comprising a concertina-folded sheet printed on both sides of the sheet, the markings on the two sides representing contiguous areas and being disposed so that a line on the map representing a route passing from one such area to the other extends around an edge of the sheet which lies at right angles to the concertina folds, the sheet having on an outer end flaps two key maps, inverted with respect to each other and corresponding respectively to the two sides of the sheet, to direct the user to the desired part of the map by means of indicia associated with the key maps which correspond to indicia provided upon the edge folds of the map.

2 Claims, 2 Drawing Figures

MAPS

The present invention relates to maps, particularly folding maps.

When using conventional folding maps, location of the desired area of the map is often difficult, involving unfolding the entire map or a large part of it, finding the area required, and possibly refolding the map to reduce it to a manageable size once again. This is a particular problem in confined spaces such as in a motor car.

The present invention thus aims to provide a folding map which is simple to use and facilitates quick location of the required area.

According to the present invention there is provided a map comprising a concertina-folded sheet printed on both sides of the sheet, the markings on the two sides representing contiguous areas and being disposed so that a line on the map representing a route passing from one such area to the other extends around an edge of the sheet which lies at right angles to the concertina folds, the sheet having on an outer end flap two key maps, inverted with respect to each other and corresponding resectively to the two sides of the sheet, to direct the user to the desired part of the map by means of indicia associated with the key maps which correspond to indicia provided upon the edge folds of the map.

In a preferred embodiment, the sheet is folded in such a way that successive panels, proceeding from the end flap having the key map thereon, are progressively wider, the said indicia being provided on the portions of the successive folds which are thereby rendered visible when the map is folded.

The indicia are preferably markings of different colours.

In addition to the concertina-folding, the map may, if desired, be further folded one or more times for convenience in carrying and storage. The map may also be provided with a protective cover.

One embodiment of the invention will now be described, by way of example only, with reference to the accompanying drawings, in which:

FIG. 1 is a perspective view of a map in accordance with the present invention; and FIG. 2 is a plan view of the map of FIG. 1.

As shown in FIG. 1, a map 1 comprises a single sheet of paper 2 folded in concertina fashion, having a plurality of folds 3 and also having a protective cover 4. If desired, of course, the sheet could be of other material such as linen or plastics sheet. The map can be folded as along line 5 for convenience in carrying and storage.

The map is printed on both surfaces of the sheet, the southern portion of the area covered by the map appearing on the left hand surface of the sheet (as viewed in FIG. 1) whilst the northern half appears on the right hand surface.

The map is arranged so that adjoining parts of the two portions appear adjacent the upper edge 6 of the sheet, with a small margin of overlap to facilitate the user following a route from one surface to the other. Thus, as viewed in FIG. 1, the southern portion on the left-hand surface appears to be the correct way up (in conventional map representations in which north is "up") whilst the northern portion on the right-hand surface appears inverted.

Each pair of facing panels (a panel being a portion of the surface of the sheet 2 lying between a pair of adjacent folds 3) has, along the lower edge 7 of the sheet, a coloured band 8 printed thereon, the band 8 of each pair having a different colour.

As can be seen from FIG. 2, in which the map is shown unfolded along line 5, upon an end flap 9 of the sheet is printed a key map 10 which is a small scale representation of the area appearing on the left-hand surface and bears coloured bands 11 corresponding to the bands 8.

In use of the map, the user refers to the key map 10 to find, for example, the location of a particular (southern) town, and notes the colour of the band 11 corresponding to that region. It may for example be the band 11$a$ shown hatched in FIG. 2. He then locates on the left hand lower corner of the map the band 8 of the same colour (i.e. band 8$a$) and opens out the map to expose the two panels 12, 13 upon which this band appears.

Also upon the end flap 9 is a second key map 14 inverted with respect to the first key map 10 and which represents the northern half of the area covered by the map. The second key map 14 and the right-hand surface of the sheet are provided with corresponding coloured bands 15, 16 similar to the bands 8, 11. To locate a town in this half, the user merely inverts the map so that the second key map 14 appears the right way up and proceeds as before, the right-hand (i.e. northern) surface of the map now appearing on the left and the right way up the only difference being that the coloured bands now appear at the top rather than the bottom.

It will thus be appreciated that the above-described map enables the user to locate the desired portion of the map simply and quickly using the key map and then immediately open the map to show that portion without the necessity for unfolding the remainder of the map, and also to follow his journey over the edge of the map when desired.

What we claim is:

1. A map comprising a concertina-folded sheet printed on both sides of the sheet, the markings on the two sides representing contiguous areas and being disposed so that a line on the map representing a route passing from one such area to the other extends around an edge of the sheet which lies at right angles to the concertina folds, the sheet having on an outer end flap two key maps, inverted with respect to each other and corresponding respectively to the two sides of the sheet, to direct the user to the desired part of the map by means of indicia associated with the key maps which correspond to indicia provided upon the edge folds of the map, and wherein the sheet is concertina-folded in such a way that successive panels, proceeding from the end flap having the key map thereon, are progressively wider, the said indicia being provided on the portions of the successive folds which are thereby rendered visible when the map is folded.

2. A map as claimed in claim 1, wherein the said indicia are markings of different colours.

* * * * *